United States Patent [19]

Hisajima et al.

[11] Patent Number: 5,048,308
[45] Date of Patent: Sep. 17, 1991

[54] ABSORPTION REFRIGERATOR

[75] Inventors: Daisuke Hisajima, Kashiwa; Tomihisa Ohuchi, Tsukuba; Seiichiro Sakaguchi; Toshifumi Kunugi, both of Chiyoda; Michihiko Aizawa, Ushiku, all of Japan

[73] Assignee: Hitachi, Ltd., Tokyo, Japan

[21] Appl. No.: 538,720

[22] Filed: Jun. 15, 1990

[30] Foreign Application Priority Data

Jun. 16, 1989 [JP] Japan .................................. 1-152388

[51] Int. Cl.$^5$ ............................................ F25B 15/00
[52] U.S. Cl. ..................................................... 62/476
[58] Field of Search ......................................... 62/476

[56] References Cited

U.S. PATENT DOCUMENTS 3,817,050 6/1974 Alexander et al. ............... 62/476 X
4,476,694 10/1984 Kuaugi ................................. 62/476

Primary Examiner—Lloyd L. King
Attorney, Agent, or Firm—Antonelli, Terry, Stout & Kraus

[57] ABSTRACT

An absorber comprises a vapor absorption portion including at least two flow paths through which an absorption solution flows down and absorbs a cooling medium vapor, at least two solution cooling portions separated from, and juxtaposed with, the vapor absorption portion and solution circulation for circulating a cooling medium vapor between the solution cooling portion and the vapor absorption portion. In this manner, a refrigerator can be made compact in size and cycle efficiency can be improved.

8 Claims, 3 Drawing Sheets

ABSORPTION REFRIGERATOR

FIELD OF THE INVENTION

The present invention relates to an absorption refrigerator.

DESCRIPTION OF THE PRIOR ART

In an absorption refrigerator, a high concentration absorption solution flowing through an absorber absorbs a cooling medium vapor evaporated in an evaporator and a cooling effect is exhibited at this time by the heat carried away from the cooling medium evaporated by the evaporator. In this manner, the absorber can be said to be the most important element of the absorption refrigerator.

When the absorption solution absorbs the cooling medium vapor, absorption heat is generated and at the same time, the concentration drops. The higher the concentration of the absorption solution and the lower the temperature, the greater the absorption capacity. Accordingly, the absorption capacity becomes smaller and smaller if cooling is not effected.

For this reason, it is the critical problem in the absorption refrigerator how the absorption capacity is maintained.

Two type of processes exist as the absorption process of the absorption refrigerator. One type of process is disclosed in Japanese Patent Laid-Open Nos. 204080/1988 and 201460/1988 and the other type of process is disclosed in Japanese Patent Publication No. 23264/1985.

In Japanese Patent Laid-Open 204080/1988, a group of heat transfer pipes are provided for cooling inside the absorber, and the absorption solution flows down outside the pipe group and in Japanese Patent Laid-Open No. 201460/1988, the absorption solution flows down inside the heat transfer pipes. This is to transfer the absorption heat generated by the absorption solution when it absorbs the cooling medium vapor to the cooling medium through the heat transfer pipes, to carry away the absorption heat outside the absorber, and to maintain the absorption capacity by maintaining a vapor pressure of the absorption solution whose concentration drops at a low level.

In Japanese Patent Publication No. 23264/1985, on the other hand, the absorption solution is sufficiently precooled and is then put into the absorber. The absorption heat generated by the absorption of the cooling medium vapor is carried away outside the absorber by the absorption whose temperature is raised as a heated medium.

In the absorption refrigerators described above, Japanese Patent Laid-Open No. 204080/1988 involves the following problems (1), (2), (3) and (6), Japanese Patent Laid-Open No. 201460/1988 involves the following problems (1), (2), (4) and (6), and Japanese Patent Publication No. 23264/1985 involves the following problems (5) and (6).

(1) The heat transfer surface for cooling and a gas-liquid interface for the absorption and the absorption solution exist, so that the shape of the heat transfer surface is complicated.

(2) Due to the existence of the gas-liquid interface for maintaining the absorption performance, the turbulent flow heat transfer by compulsive connection having a high heat transfer effect cannot be utilized and the scale of a heat-exchanger becomes greater as the exchanger having the same capacity.

(3) In the absorption refrigerator, the cooling medium vapor flows from the evaporator to the absorber due to the pressure difference between the vapor pressure of the evaporator and the vapor pressure of the absorber but if the number of heat transfer pipes for cooling inside the absorber is increased in order to improve the cooling capacity, the heat transfer pipe group functions as a fluidization resistance to the cooling medium vapor. Since the cooling medium vapor does not sufficiently flow from the evaporator in this case, the cooling capacity in the evaporator drops.

(4) If the length of the heat transfer pipe is increased to improve the absorption capacity when the absorption solution is caused to flow down inside the heat transfer pipe, the heat transfer pipe itself becomes the fluidization resistance to the cooling medium vapor and the cooling medium vapor does not flow sufficiently from the evaporator. Accordingly, the cooling capacity of the evaporator drops.

(5) Since the temperature of the absorption solution rises before the solution absorbs a large quantity of cooling medium, the absorption capacity drops and the concentration between the outlet and inlet of the absorber does not change in a great amount.

Accordingly, the quantity of the absorption solution circulated in the cycle must be extremely increased and unnecessary energy is required when the absorption solution is regenerated by a regenerator.

(6) In the evaporator, the cooling medium evaporates and cooling water is gradually cooled. Depending on evaporation temperature of the cooling medium, however, the vapor pressure of the cooling medium changes and a pressure differential is generated between the outlet and inlet of the evaporator. However, this pressure differential has not been sufficiently taken into consideration in the past. Therefore, the vapor pressure differential has not been sufficiently effectively utilized.

OBJECT OF THE INVENTION

It is therefore an object of the present invention to provide an absorption refrigerator which improves the problems described above, makes each element of the refrigerator compact by effective utilization of a vapor pressure differential and the turbulent flow heat transfer and at the same time, improves cycle efficiency.

STATEMENT OF THE INVENTION

The present invention pays a specific attention to the vapor pressure differential between the evaporator and the absorption portion of the absorber and constitutes the absorber, as means for solving the above-noted problems (1), (2), (3), (4) and (5) described above, by a vapor absorption portion, a solution external cooling portion and a solution circulating device.

After the absorption solution, supplied from the regenerator is cooled in a first solution external cooling portion, the absorption is caused to flow down to the vapor absorption portion and to absorb the vapor of the cooling medium evaporated in the evaporator, is then led to a second solution external cooler through the first solution circulating device, is cooled there, from the external cooler is introduced again into the vapor absorption portion, caused to flow down without being mixed with the previous solution and is subjected repeatedly stages, so that the absorption solution finally flowing down through the vapor absorption portion is pressure-fed to the regenerator.

As to the problem (6) described above, baffle plates or the like for making the direction of the vapor pressure differential to be the same direction are disposed between the evaporator and the absorption portion as means for utilizing effectively the vapor pressure differential between the evaporator and the absorption portion of the absorber.

In other words, the lower pressure portion of the vapor absorption portion and the low pressure portion of the evaporator are connected and the high pressure portion of the vapor absorption portion and the high pressure portion of the evaporator are connected so that the vapor can move. In this manner, the problem (6) can be solved.

The flow described above occurs between the evaporator and the absorber but the same also occurs between the regenerator and a condenser.

Accordingly, the condenser of the present invention includes a vapor condensation portion, a cooling medium cooling portion which is separated from the vapor condensation portion and cooling medium circulation means, as means for making the condenser compact. The cooled cooling medium is caused to condense the vapor condensation portion and is supplied to the evaporator with the rest being cooled at the cooling portion and being again caused to flow down through the vapor condensation portion.

The following functions can be obtained by constructing the absorber, the evaporator, the condenser and the regenerator in the manner described above.

The vapor pressure of the absorption solution, sufficiently cooled, is extremely low and efficiently absorbs the vapor due to a pressure differential with the evaporator and, in this manner the absorber main body can be compact.

Since the absorption heat generated in the absorber can be discharged by turbulent flow heat transfer by the cooling portion without involving the absorption phenomenon, the solution cooling device main body, too, can be compact.

The absorption solution which sufficiently absorbs the vapor inside the absorber, whose concentration somewhat drops, whose temperature has risen and which cannot absorb more vapor, flows down to cool externally and is then routed to flow down again into the absorption portion. When these operations are repeated in multiple stages, it becomes possible to lower the concentration near the limit of the absorption capacity of the absorption solution and to prevent the increase in the cycle circulating flow rate of the absorption solution. The direction of the vapor pressure difference between the absorption portion of the absorber and the evaporator is set to the same direction.

In other words, the vapor is allowed to move at the absorption solution inlet portion in the absorber where the vapor pressure is low and at the cooling medium outlet portion where the vapor pressure becomes low. The vapor pressure can be utilized effectively and the cooling medium inlet portion correspond to each other, and the concentration can be lower near to the limit of the vapor absorption capacity of the absorption solution.

In this manner, the condenser main body and the cooling device can be made compact by using the concept of the utilization of the vapor pressure differential between the two heat-exchangers between the regenerator and the condenser (that is, by forming the condenser as an external cooling type and setting the direction of the vapor pressure differential to the same direction).

Cooling of the cooling medium by the condenser while separated from the condenser makes it possible to reduce the vapor pressure of the cooling medium to the maximum possible extent. Accordingly, the vapor existing the regenerator can be efficiently condensed and, at the same time, the operating temperature of the regenerator can be reduced.

DESCRIPTION OF THE PREFERRED EMBODIMENTS

Figure 1:
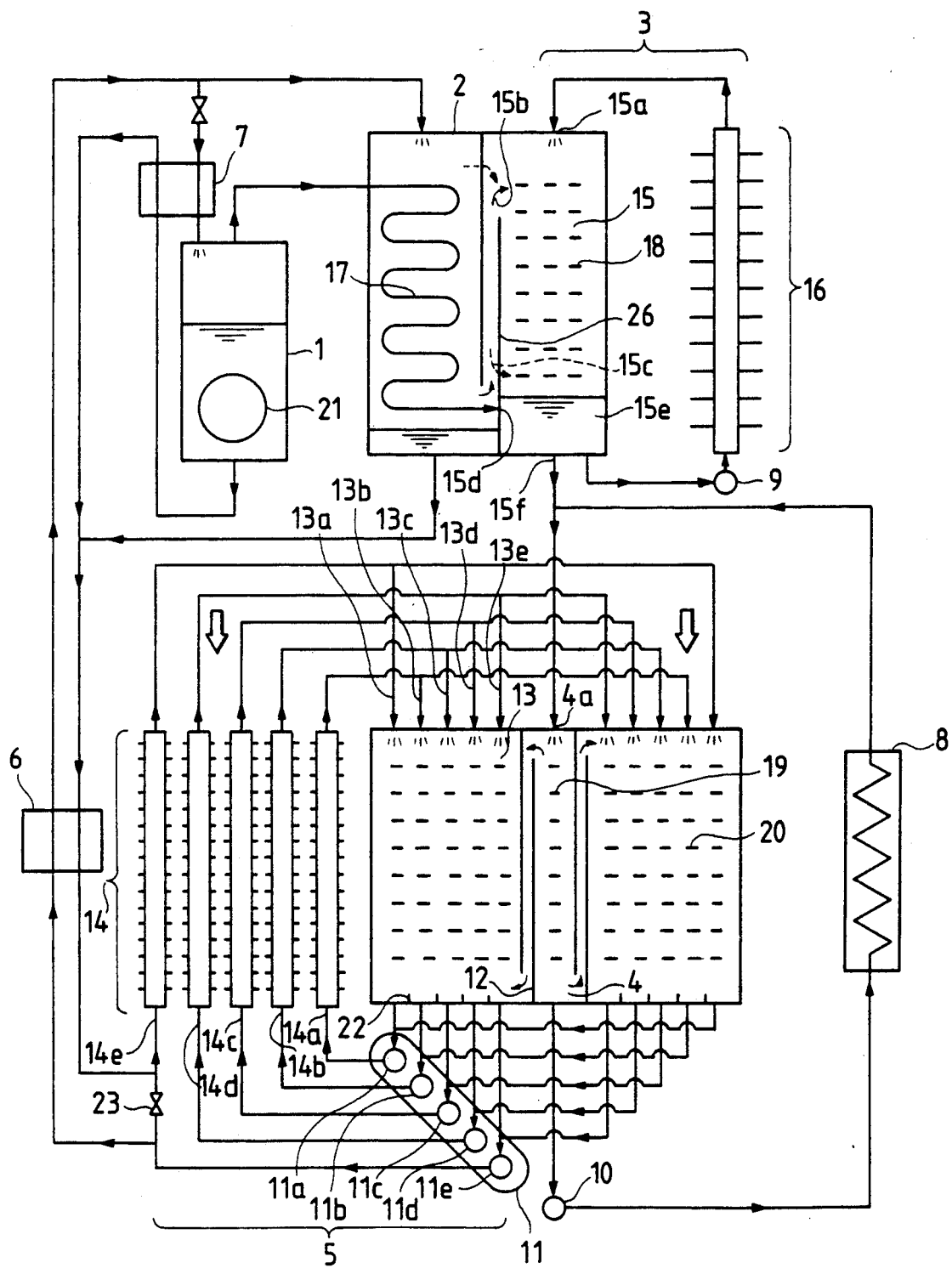
FIG. 1 is a schematic view of a cycle system of an absorption refrigerator in accordance with an embodiment of the present invention.

Referring now to the drawings wherein like reference numerals are used throughout the various views to designate like parts and, more particularly, to FIG. 1, according to this figure, an absorption refrigerator in accordance with the present invention includes a high temperature regenerator 1, a low temperature regenerator 2, a condenser 3, a flash evaporator 4 (hereinafter evaporator), an absorber 5, a low temperature heat-exchanger 6, is a high temperature heat-exchanger 7, an indoor unit 8, a cooling medium circulation device 9, a cooling water circulation device 10, and an absorption solution circulation device including circulation devices 11a–11e.

Among them, conventional devices can be used for the devices other than the condenser 3, the evaporator 4, the absorber 5 and the circulation devices 9, 10 and 11. The absorber 5 comprises a vapor absorption portion 13 and a counter-flow cooling portion 14 including cooling portions 14a–14e.

The absorption solution outlets of the high and low temperature regenerators 1, 2 are communicated with the cooling portion 14e, through the heat-exchangers 6, 7, respectively, then with the inlet 13a of the vapor absorption portion 13 and further with the solution circulation device 11a through this vapor absorption portion 13. The vapor absorption circulation device 11a is further communicated with the cooling portion 14a which in turn, communicates with the inlet 13b of the absorption portion 13 so as to absorb the cooling medium vapor inside the absorption portion 13 and from there the absorption solution flows down.

The absorption solution, gradually diluted is circulated by the solution circulation device 11b, supplied to and cooled at the external cooling portion 14b, is and is then guided to the inlet 13c of the cooler 13. In this manner the cooling portion 14, the absorption portion 13 and the circulation device 11 are finally interconnected in multiple stages and are connected from the solution circulation device 11e to the high and low temperature regenerators 1 and 2.

The condenser 3 comprises a vapor condensation portion 15, a cooling portion 16, a cooling medium circulation device 9 and baffle plates 26. The cooling medium vapor, liquefied in the low temperature regenerator 2, flows into the lower inlet 15d of the vapor condensation portion 15 and the cooling medium vapor, vaporized in the low temperature regenerator 2, flows into the vapor condensation portion 15 from the upper and lower inlets 15b, 15c of the vapor condensation portion 15.

The lower portion 15e of the vapor condensation portion 15 is a liquid reservoir, and part of the evaporator 4 from the outlet 15f. The major proportion of the cooling medium is cooled in the cooling portion 16 through the cooling medium circulation device 9 and flows from the inlet 15a of the condenser 15. A baffle plate 12 for controlling a vapor flow is disposed between the evaporator 4 and the absorption portion 13.

In operation, the absorption solution is heated, vaporized and boiled by the combustion gas inside the burner 21 in the high temperature regenerator 1, generates the cooling medium vapor and is condensed. The resulting cooling medium vapor, led into the heat transfer pipe 17 of the low temperature regenerator 2, heats the absorption solution sprayed outside the heat transfer pipe 17, generates and condenses the cooling medium vapor, and is, by itself, condensed and liquefied and supplied to the inlet 15d of the condensation portion 15. The flow path of the cooling medium vapor, generated in the low temperature regenerator 2, is turned upside down by the baffle plate 26 and the cooling medium vapor is led into the inlets 15b, 15c of the condensation portion 15. The cooling medium vapor flowing from the inlet 15b of the condensation portion 15 meets with the already cooled cooling medium and is mixed and condensed.

Part of the cooling medium is led to the evaporator 4 through the outlet 15f of the condensation portion 15 but a major proportion, sufficiently cooled by the cooling portion 16 through the cooling medium circulation device 9, again flows into the condensation portion 15 and condense the cooling medium vapor. Although a packing material 18 as illustrated as being disposed inside the condensation portion 15, such packing material 18 need not be provided; however, the packing material 18 increases the surface area and residence time of the cooling medium if provided.

The strong or dense solution generated by the high and low temperature regenerators 1 and 2 is led into the external cooling portion 14e of the absorber 5 through the high and low temperature heat-exchangers 7 and 6. The sufficiently cooled absorption solution enters the absorption portion 13 from the inlet 13a of the vapor absorption portion 13 and starts suctioning the vapor. At this time vapor pressure differential of the absorption solution with the evaporated vapor becomes great and the absorption solution absorbs the vapor at the relatively low pressure portion (near the cooling water outlet) inside the evaporator 4.

The absorption solution is eventually heated and flows down while absorbing the vapor inside the absorption portion 13 and is heated and diluted until absorption solution cannot absorb any more the vapor of the relatively high pressure portion inside the evaporator 4 (near the cooling water inlet), and is thereafter led to the solution circulation device 11a. Thereafter, the absorption solution is sufficiently cooled through the external cooler 14a, is led to the inlet 13b of the vapor absorption portion 13 and begins an absorption process.

Figure 2:
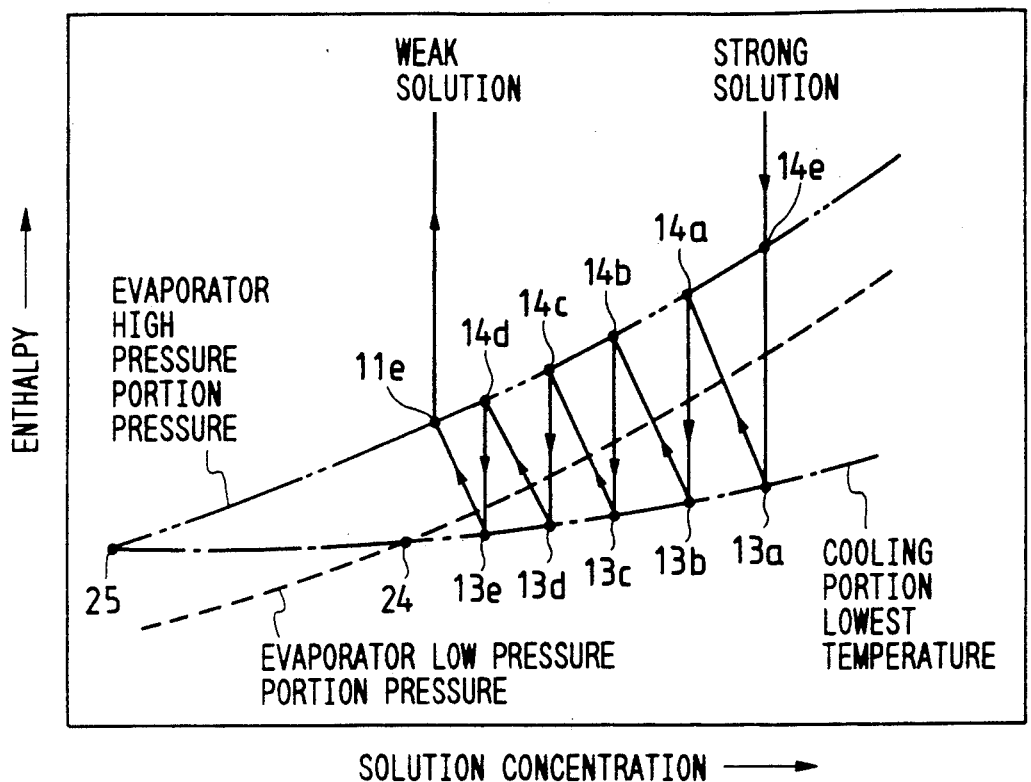
FIG. 2 is a graphical illustration of an absorption solution concentration vs. enthalpy diagram of accomplishing the absorption refrigeration cycle.

The absorber 5 repeats these cooling, absorption and circulation operations in multiple stages and FIG. 2 shows this cycle on a solution concentration (solute concentration vs. enthalpy diagram). Reference numerals in the diagram correspond to the numerals at each position in FIG. 1. Though above described embodiment uses five stages, the number of stages may be greater than five stages.

In accordance with the conventional cycle, absorption can be effected only up to the point of intersection 24 between the evaporator outlet pressure (dash line) and the cooling portion lowest temperature (one-dot-chain line) but in accordance with this cycle, absorption can be brought up to the point of intersection 25 between the inlet pressure (two-dot-chain line) of the evaporator 4 and the cooling portion lowest temperature by increasing the number of stages.

Though the packing material 20 inside the absorber 5 as shown in FIG. 1 need not be provided, the absorption quantity can be increased by packing the packing material 20 due to the increase in the surface area and residual time of the solution. The solution guide 22 at the outlet portion of the vapor absorption portion 13 prevents the drop of efficiency due to the mixture such as means for securing the space can be taken besides the structure of this embodiment. The solution circulation portion 11 may be replaced by alternative means such as pump driving, gravity fall and siphon systems.

The absorption solution which is diluted as a result of absorption may be, as such, returned to the high and low temperature regenerators 1 and 2 by the solution circulation portion 11e but a part of the absorption solution may be mixed with the strong or dense solution flowing from the high and low temperature regenerators 1, 2 so as to adjust the solution concentration.

As to the flow of the cooling medium and cold water sent to the indoor unit 8, the cooling medium leaving the outlet 15f of the condensation portion 15 of the condenser 3 is first mixed with cold water and is then sprayed into the evaporator 4 from its inlet 4a.

As cooling medium flows down inside the evaporator 4, it generates the vapor corresponding to the amount of the cooling medium and at the outlet of the evaporator 4, sufficiently cooled water in the amount corresponding to cold water is supplied by the cold water circulation device 10 to the indoor unit 8.

Figure 3:
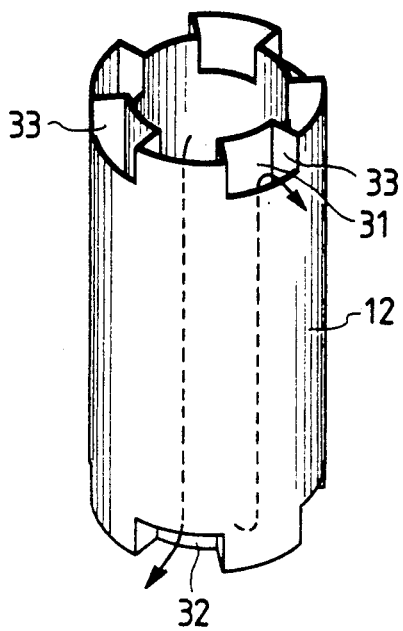
FIG. 3 is a schematic perspective view of baffle plates between an absorption portion of an absorber and an evaporator and between a condensation portion of a condenser and a low temperature regenerator.

FIG. 3 shows an example of the baffle plate 12 for vapor control which is interposed between the absorption portion 13 and the evaporator 4. Namely, a double-cylinder pipe is equipped alternately with notches 31 and 32 at its upper and lower portions, with a partition 33 being disposed between the double-cylinder pipe in such a manner that the notches 31, 32 alternate with one another and vapor flow paths can be formed at the notches 31, 32. Accordingly, the vapor flowing from the inner upper portion of the baffle plate 12 exits the outer lower portion. The vapor flowing from the inner lower portion can move to the outer upper portion without being mixed.

Figure 4:
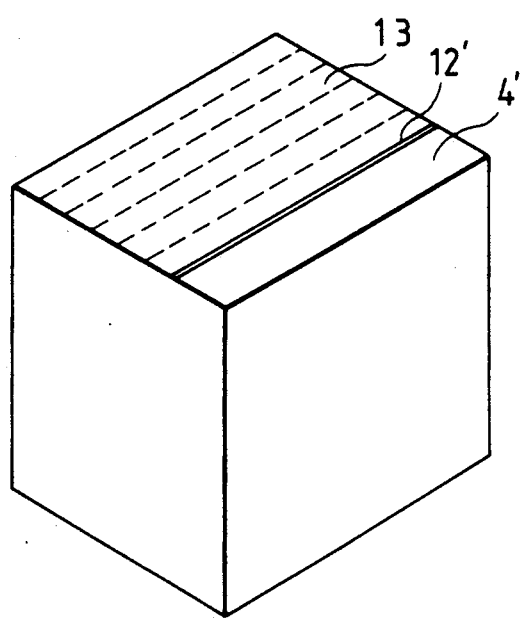
FIGS. 4, 5, 6 and 7 are schematic perspective views of different absorbers and evaporators, respectively.
Figure 5:
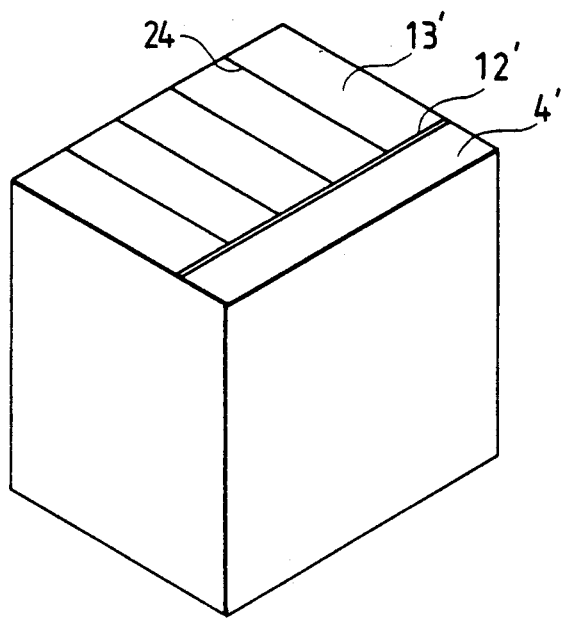

Though the embodiment of FIG. 3 uses eight partitions, this number may be greater or smaller. If the absorption portion 4' is rectangular, as shown in FIG. 4, the partitions may be a flat plate 12' and the same effect can be obtained. Furthermore, it is possible to dispose the partitions 24 in the absorption portion 13' so as to divide the latter as shown in FIG. 5.

Figure 6:
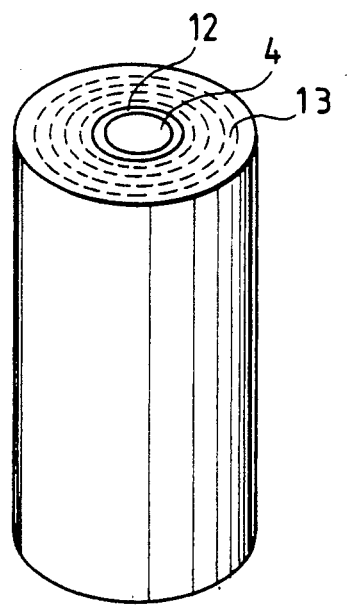
Figure 7:
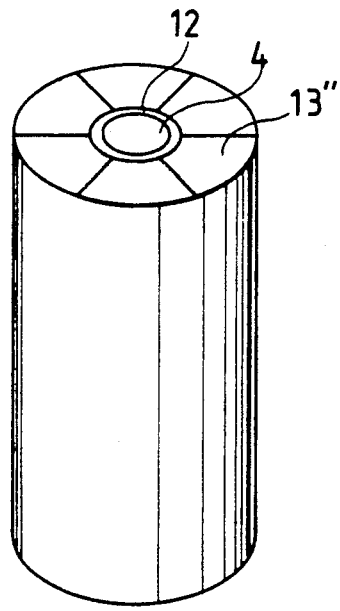

In the embodiment shown in FIG. 1, the absorption portion 13 is disposed concentrically in multiple stages in such a manner so as to encompass the evaporator 4 as shown in FIG. 6 but the same effect can be obtained when each stage of the absorption portion 13" is formed in a radial direction and is disposed in an irregular sequence as shown in FIG. 7.

The effect of the present invention can be obtained even when the baffle plate 12 without a baffle plate 12; however, the provision of the baffle plate 12 improves the effect of the present invention.

The present invention provides the effect not only a double effect type as in the above-described embodiment but also in a single effect type or multiple effect type.

As described above, the invention provides the following advantageous effects.

When the absorption process and the cooling process are separated, the cooling capacity of the absorption refrigerator can be maintained without increasing the cycle circulation quantity of the absorption solution by assembling the multi-stage cycle.

The absorption limit concentration of the absorption solution can be lowered by utilizing the baffle plate between the absorber and the evaporator.

Since the condensation process and the cooling process are separated in the condenser, the cooling portion of the condenser can be made compact in size.

The condensation portion of the condenser can be made compact in size by utilizing effectively the vapor pressure difference between the regenerator and the condensation portion in the condenser.

What is claimed is:

1. An absorption refrigerator including an evaporator, an absorber, a regenerator and a condenser, said absorber includes a vapor absorption portion formed by at least two flow paths through which an absorption solution flows downwardly and absorbs a cooling medium vapor, at least two solution cooling portions separated from and juxtaposed with said vapor absorption portion, and circulation means for circulating said absorption solution absorbing said cooling medium vapor disposed between said solution cooling portions and said vapor absorption portion, and means for causing said absorption solution, supplied from a regenerator and cooled in said first solution cooling portion, to flow down through said first vapor absorption portion so as to absorb the cooling medium vapor evaporated in said evaporator, then leading the absorption solution to said second solution cooling portion through said first solution circulation portion and cooling the absorption solution thereat, causing said absorption solution to again flow down through a flow path of said vapor absorption portion different from the flow path through which the absorption solution has previously flowed down, so as to absorb said cooling medium vapor, and for returning said absorption solution flowing down through said flow path of said vapor absorption portion to said regenerator.

2. The absorption refrigerator according to claim 1, wherein said vapor absorption portions are disposed concentrically around said evaporator.

3. The absorption refrigerator according to claim 1, which includes the process for absorbing said cooling medium vapor until the pressure at a high pressure portion of said evaporator and the pressure at a low pressure portion of said cooling portion of said absorber reach equilibrium.

4. An absorption refrigerator including an evaporator, an absorber, a regenerator and a condenser, said absorber includes a vapor absorption portion formed by at least two flow paths through which an absorption solution flows and absorbs a cooling medium vapor, at least two solution cooling portions separated from and juxtaposed with said vapor absorption portion, circulation means for circulating said absorption solution absorbing said cooling medium vapor disposed between said solution cooling portions and said vapor absorption portion, means for causing said absorption solution, supplied from a regenerator and cooled in said first solution cooling portion to flow through said first vapor absorption portion so as to absorb the cooling medium vapor evaporated in said evaporator, then leading the absorption solution to a second solution cooling portion through said first solution circulation means and cooling the absorption solution thereat, causing said absorption solution to again flow through a flow path of said vapor absorption portion different from the flow path through which the absorption solution has previously flowed, so as to absorb said cooling medium vapor, and returning said absorption solution flowing through said flow path of said vapor absorption portion to said regenerator, and means for connecting a low pressure portion of said vapor absorption portion to a low pressure portion of said evaporator and a high pressure portion of said vapor absorption portion to a high pressure portion of said evaporator.

5. The absorption refrigerator according to claim 2, wherein baffle plates for causing a vapor pressure differential are disposed as connection means between said evaporator and said absorption portion of said absorber, and wherein said baffle plates connect a low pressure portion of said vapor absorption portion to a low pressure portion of said evaporator and a high pressure portion of said vapor absorption portion to a high pressure portion of said evaporator.

6. An absorption refrigerator including an evaporator, an absorber, a regenerator and a condenser, wherein said condenser comprises a vapor condensation portion, a cooling medium cooling portion separated from said vapor condensation portion, and cooling medium circulation means for circulation a cooling medium between said cooling medium cooling portion and said vapor condensation portion, said cooling medium cooled in said cooling medium portion is caused to absorb and condense the vapor supplied from said regenerator, a portion of said cooling medium flowing from said vapor condensation portion is supplied to said evaporator, and wherein a remainder of said cooling medium is supplied to said cooling medium cooling portion by said cooling medium circulation means and is caused to flow again through said vapor condensation portion.

7. The absorption refrigerator according to claim 6, further comprising means for connecting a high pressure portion of said regenerator to a high pressure portion of said condenser and a low pressure portion of said regenerator to a low pressure portion of said condenser in the vapor flow path from said regenerator.

8. An absorption refrigerator including an evaporator, an absorber, a regenerator, a condenser, and means for causing an absorption solution exiting from said regenerator to be cooled by cooling means before the absorption solution absorbs a cooling medium to the lowest temperature of a cooling portion, then causing said absorption solution to adiabatically absorb the cooling medium vapor until said absorption solution enters an equilibrium state with a pressure of a high pressure portion of said evaporator, causing said absorption solution to be cooled once again to the lowest temperature of said cooling portion and causing said absorption solution to once again adiabatically absorb said cooling medium vapor.

* * * * *